United States Patent [19]

Paynter et al.

[11] Patent Number: 4,806,824
[45] Date of Patent: Feb. 21, 1989

[54] FLUORESCENT LAMP USING MULTI-LAYER PHOSPHOR COATING

[75] Inventors: John Paynter, Painesville; George R. Gillooly, Cleveland Heights; Thomas F. Soules, Richmond Heights; Mary V. Hoffman, South Euclid, all of Ohio

[73] Assignee: General Electric Company, Schenectady, N.Y.

[21] Appl. No.: 166,739

[22] Filed: Mar. 2, 1988

Related U.S. Application Data

[63] Continuation of Ser. No. 849,081, Apr. 4, 1986, abandoned.

[51] Int. Cl.⁴ ............................................. H01J 63/04
[52] U.S. Cl. .................................... 313/486; 313/487; 252/301.6 P
[58] Field of Search ...................... 313/487, 486, 485; 252/301.6 P, 301.4 P

[56] References Cited

U.S. PATENT DOCUMENTS

| | | | |
|---|---|---|---|
| 2,962,616 | 11/1960 | Homer et al. | 313/486 |
| 3,023,340 | 2/1962 | Repsher | 313/486 |
| 3,109,819 | 11/1963 | Gillooly et al. | 252/301.6 |
| 3,255,373 | 6/1966 | Van Broekhoven et al. | 313/486 |
| 3,636,352 | 1/1972 | Wanmaker et al. | 313/486 X |
| 3,707,642 | 12/1972 | Thornton, Jr. | 313/486 |
| 3,798,479 | 3/1974 | Chiola et al. | 313/486 |
| 3,833,827 | 9/1974 | Shaffer | 313/486 |
| 4,166,234 | 8/1979 | Tak et al. | 313/486 |
| 4,266,160 | 5/1981 | Chenot | 313/486 |
| 4,305,019 | 12/1981 | Graff et al. | 313/487 |
| 4,431,941 | 2/1984 | Roy et al. | 313/487 |

FOREIGN PATENT DOCUMENTS

1371968 10/1974 United Kingdom .

Primary Examiner—David K. Moore
Assistant Examiner—Michael Horabik
Attorney, Agent, or Firm—Edward M. Corcoran; J. F. McDevitt; Stanley C. Corwin

[57] ABSTRACT

A fluorescent lamp utilizing a dual layer phosphor coating is disclosed and with the base layer employing a calcium halophosphate phosphor which has been modified to provide efficient lumen output at a substantially reduced coating weight. The top phosphor layer in said coating comprises a blend of narrow bandwith emitting phosphors at various coating weights primarily to improve the color rendering capability of these lamps.

14 Claims, 2 Drawing Sheets

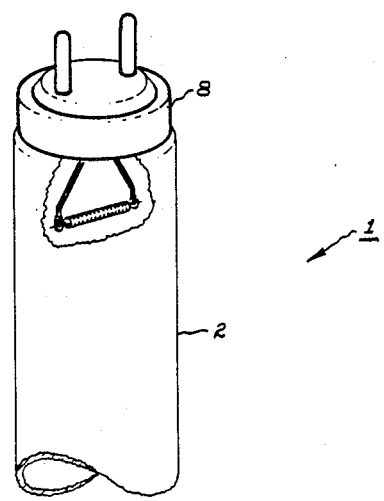
Fig.1
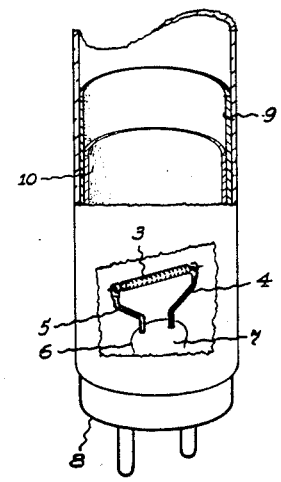

FLUORESCENT LAMP USING MULTI-LAYER PHOSPHOR COATING

This application is a continuation of application Ser. No. 849,081, filed Apr. 4, 1986, now abandoned.

RELATED PATENT APPLICATION

In patent application Ser. No. 849,082 now abandoned in favor of FWC Ser. No. 165,373, filed concurrently herewith and assigned to the assignee of the present invention there is disclosed a modified calcium halophosphate phosphor producing efficient lumen output together with acceptable color rendition for use in a fluorescent lamp at a reduced phosphor cost. More particularly, the fluorescent lamp produces white color illumination with a reduced coating weight of the modified phosphor material without substantially decreasing the lamp performance characteristics. Since the present invention represents an improvement thereon wherein the same phosphor material is utilized in combination with other phosphors, said above referenced patent application is hereby expressly incorporated into the present application by reference.

BACKGROUND OF THE INVENTION

This invention relates generally to fluorescent lamps utilizing a dual phosphor layer of different phosphors to produce a high lumen output together with good color rendition. More particularly, this invention deals with such dual phosphor layer fluorescent lamps providing these desired results wherein the base layer of a modified calcium halophosphate phosphor is deposited on the glass surface at considerably lower dry coating weights as a means to reduce the overall phosphor weight in such lamps.

Efficient illumination of a white color along with good color rendition is now provided in fluorescent lamps with dual layer phosphor coatings employing various combinations of three narrow band emitting phosphor materials in the top phosphor layer each producing red, blue or green color emission. For example, there is disclosed in U.S. Pat. No. 4,088,923 a combination of said top tri-phosphor materials in the top layer of a dual phosphor layer fluorescent lamp which is superposed on a base layer of conventional calcium halophosphate phosphor to produce efficient visible illumination of a white color at a lower cost than provided with a single layer of the blended narrow bandwith emitting phosphors. A disclosure of suitable narrow band emitting phosphor materials for use in this manner is found in U.S. Pat. No. 3,937,998 wherein the blue color emission phosphor exhibits an emission band in the wavelength region from about 430 nanometers wavelength up to about 490 nanometers wavelength, the red color emission phosphor exhibiting an emission band in the wavelength range from about 590 nanometers wavelength up to about 630 nanometers wavelength, and with the green color emission phosphor producing emission extending from 520 nanometers wavelength up to about 565 nanometers wavelength. A dual layer fluorescent lamp phosphor coating of this type is also disclosed in U.S. Pat. No. 4,431,941 wherein reduced coating weights of the top phosphor layer having the same blend of these tri-phosphors are employed to still further reduce the overall phosphor costs of lamp manufacture. In said latter dual phosphor layer coating, however, a base layer coating weight of 4.4 milligrams per square centimeter is reported for the cool white type calcium halophosphate phosphor employed.

Since the overall phosphor costs in a fluorescent lamp still remain appreciable it is desireable to further decrease the overall amount of phosphor needed in the dual layer phosphor coating. As disclosed in the above referenced concurrently filed patent application, it is now possible to lower the dry coating weight for a single layer coating of a modified calcium halophosphate phosphor to a range from about 1.7 milligrams per square centimeter up to about 4.0 milligrams per square centimeter. While said improvement essentially maintains the lumen output and color rendering capability of a fluorescent lamp utilizing a single layer of the calcium halophosphate phosphor, however, it still lacks the higher CRI values of 68 or greater that are now achieved in these lamps with conventional dual layer phosphor coatings. Accordingly, it still remains desireable to further lower the total weight of said dual layer phosphor coatings while not sacrificing either lumen output or CRI values in such modified fluorescent lamps.

SUMMARY OF THE INVENTION

Improved dual phosphor layers are now provided as a coating in a fluorescent lamp producing white color illumination at a reduced weight of the overall phosphor coating. More particularly, in a fluorescent lamp comprising a glass envelope having electrodes at its ends, a mercury inert gas filling within said glass envelope which produces ultraviolet radiation, and a phosphor coating which converts a substantial portion of said ultraviolet radiation to visible illumination having a white color, the improvement made in said phosphor coating comprises a dual layer of a first phosphor layer deposited on the inner glass surface and a second phosphor layer deposited on the first phosphor layer, said second phosphor layer comprising a blend of narrow bandwith emitting phosphors whereas said first phosphor layer comprises phosphor particles having the particle size range extending from about 4 microns average diameter up to about 8 microns average diameter having been deposited at a dry coating weight in the range from about 1.3 milligrams per square centimeter up to about 3.5 milligrams per square centimeter at said particle size range and said phosphor having the general formula:

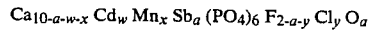

$$Ca_{10-a-w-x} Cd_w Mn_x Sb_a (PO_4)_6 F_{2-a-y} Cl_y O_a$$

wherein
 a is in the approximate range of 0.1–0.2
 w is in the approximate range of 0–0.2
 x is in the approximate range 0.15–0.5, and
 y is in the approximate range 0.03–0.3
whereby said lamp provides efficient lumen output at a substantially reduced total phosphor coating weight. The total metal ion content in the presently modified calcium halophosphate phosphor is desireably maintained equal to at least 9.97 in order to avoid diluting or deleterious secondary phases being formed during the phosphor synthesis. Additionally, said presently improved dual layer phosphor coatings convert substantially all of the incident ultraviolet radiation into visible light when employed in the low pressure type fluorescent lamps hereinafter more fully described.

Representative low pressure type fluorescent lamps according to the present invention utilize top coating weights of the narrow bandwith emitting phosphor blend at a dry coating weight in the range from about 0.45 milligrams per square centimeter up to about 1.8 milligrams per square centimeter. Such relatively thin top phosphor layers are primarily responsible for maintaining a CRI value in the dual phosphor layer coated lamps of at least 68. To produce said minimum CRI value in the present lamps with the preferred tri-phosphor blends also hereinafter more fully identified requires a top coating weight in the approximate range 0.45–0.78 milligrams per square centimeter. A CRI value of 78 or greater can be achieved with said preferred tri-phosphor blends at top coating weights in the approximate range 1.13–1.78 milligrams per square centimeter. A typical cool white color fluorescent lamp having the above specified dual phosphor coating weights can be produced exhibiting trichromatic coordinates of approximately X =0.376 and Y =0.387 wherein the modified calcium halophosphate phosphor contains manganese levels in the approximate range 0.15–0.20 with antimony levels residing in the approximate range 0.1–0.2. Correspondingly, a typical white color fluorescent lamp of this type with the aforementioned dual phosphor coating weights having trichromatic coordinates of approximately X =0.413 and Y =0.393 utilizes a modified calcium halophosphate phosphor wherein the manganese content is in the approximate range 0.23–0.28 while the antimony level is maintained in the approximate range 0.1–0.2. A warm white color lamp having trichromatic coordinates of approximately X =0.440 and Y =0.403 at about the same dual phosphor layer coating weights and with the modified calcium halophosphate phosphor therein employed having a manganese content in the approximate range 0.35–0.40 while the antimony level remains in the approximate range 0.1–0.2.

Relatively less expensive narrow band emitting phosphor materials are employed in the preferred low pressure type fluorescent lamps of the present invention. Specifically, a green color emitting terbium-activated lanthanum cerium orthophosphate phosphor that is disclosed in U.S. Pat. No. 4,423,349 provides a lower cost substitute for the terbium and cerium co-activated magnesium aluminate phosphor component ordinarily employed in conventional top layer tri-phosphor blends. Similarly, a lower cost modified europium-activated strontium chloroapatite phosphor can be substituted for the europium-activated barium magnesium aluminate phosphor to serve as the narrow band blue color emission phosphor component in said tri-phosphor blend. A substitute phosphor of this type is specifically disclosed in U.S. Pat. No. 4,075,532 for use in a phosphor coating providing white color illumination in a fluorescent lamp with both of said narrow bandwith blue color emission phosphors. In a representative 40 watt size T-12 fluorescent lamp providing white color illumination at a warm white (3,000° K.) lamp color point said tri-phosphor blend utilizes approximately 5% by weight of the europium-activated strontium barium calcium chlorophosphate phosphor as the blue color emission component, approximately 27.5 weight percent of the aforementioned terbium-activated lanthanum cerium orthophosphate phosphor as the green color emission phosphor content, and approximately 67.5 weight percent of the conventional europium-activated ytrium oxide phosphor component to produce the desired lamp performance. A cool white (4,100° K.) color point lamp can be achieved with said preferred tri-phosphor blend as a top layer in representative proportions of 13 weight percent blue color emission phosphor, 36.5 weight percent green color emission component, and 50.5 weight percent red color emission phosphor component. For a white (3,500° K.) color point lamp the weight porportions in the preferred tri-phosphor blend is further adjusted to contain 8 weight percent blue color emission phosphor, 27.5 weight percent green color emission phosphor component, and 64.5 weight percent red color emission phosphor component. Suprisingly, higher light output is produced with the preferred tri-phosphor blend as compared with dual coated lamps utilizing a conventional tri-phosphor blend.

BRIEF DESCRIPTION OF THE DRAWINGS

FIG. 1 illustrates in perspective view a partially broken away section of a low pressure mercury discharge fluorescent lamp construction utilizing a dual layer phosphor coating in accordance with the present invention.

DESCRIPTION OF THE PREFERRED EMBODIMENTS

Figure 2:
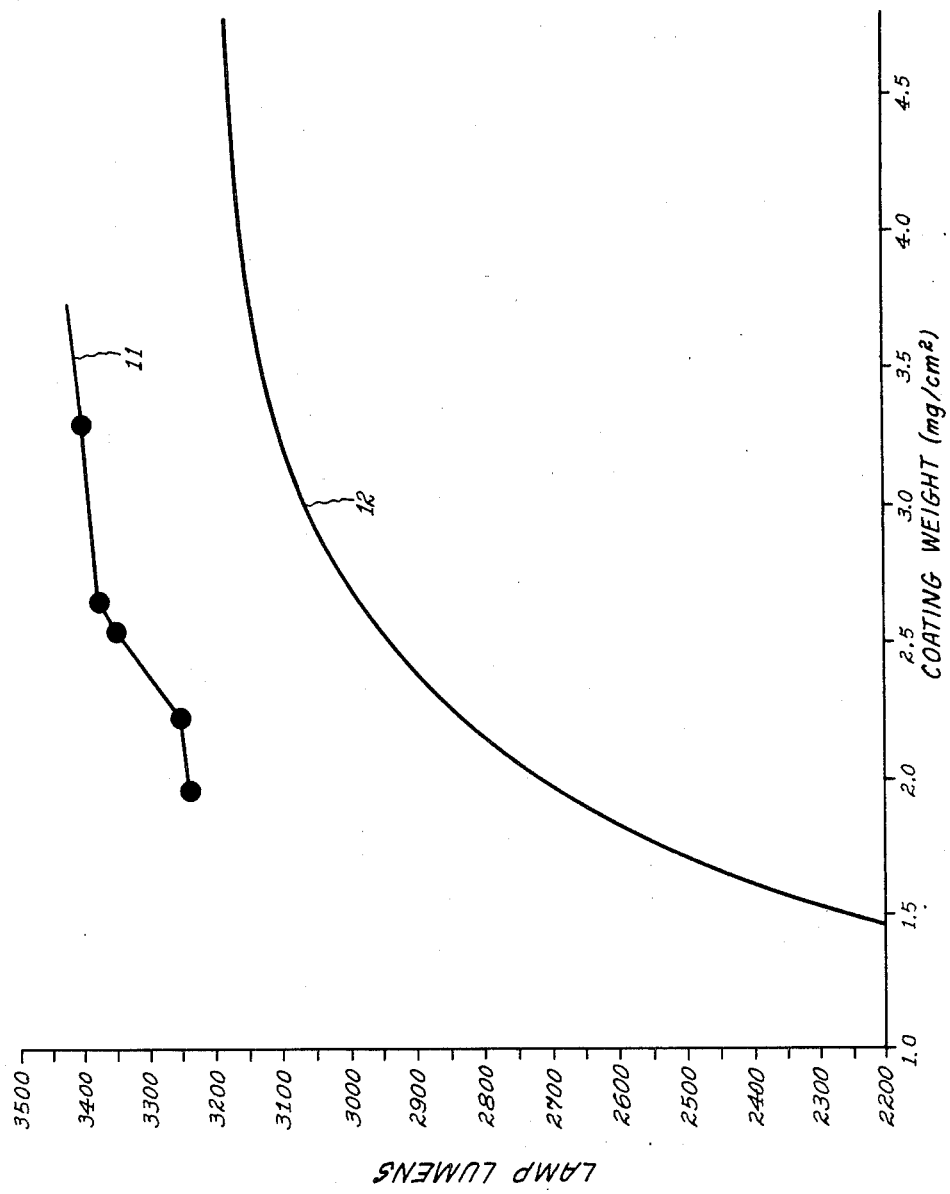
FIG. 2 is a graph depicting lumen performance for various phosphor coatings in the FIG. 1 type lamp construction.

Referring to FIG. 1, there is depicted a representative fluorescent lamp 1 comprising an elongated soda-lime silicate glass envelope 2 having a circular cross-section. The low pressure mercury discharge assembly in said lamp includes a conventional electrode structure 3 at each end connected to lead-in wires 4 and 5 which extend through a glass press seal 6 in a mount stem 7 to the electrical contacts of a base 8 fixed at both ends of the sealed glass envelope. The discharge-sustaining filling in said sealed glass envelope is an inert gas such as argon or a mixture of argon and other rare earth gases at a low pressure in combination with a small quantity of mercury to provide the low vapor pressure manner of lamp operation. The inner surface of the glass bulb is provided with a phosphor coating 9 having the aforementioned modified calcium halophosphate phosphor composition to provide white color illumination at the desired lamp color point. Deposited on the surface of said phosphor base layer 9 is a tri-phosphor top coat blend 10 according to the present invention and which can further utilize the preferred phosphor components above described as a still further means to lower the cost of the overall phosphor coating. Said type lamps can still further include an optically transparent tin oxide conductive layer (not shown) which is deposited on the glass surface as a starting aid.

The above illustrated dual phosphor layer coatings can be formed by various already known procedures including deposition from liquid suspensions and electrostatic deposition. For example, the base layer of calcium halophosphate phosphor can be deposited on the glass surface from a conventional aqueous suspension including various organic binders and still other adherence promoting agents. A typical liquid coating suspension for said purpose can contain 1313 grams of the calcium halophosphate phosphor solids suspended in 650 milliliters of a 1 percent by weight polyacrylic acid binder, 78 milliliters of a 5 percent by weight polyvinylmethylether/maleic anhydride copolymer binder, 6 milliliters of a mono ethanol amine pH control agent, 24 milliliters of ammonium hydroxide pH control agent, 12 milliliters of a nonionic surfactant, and 36 milliliters of a 5 percent by weight barium nitrate solution as a further adherance promoting agent. Said aqueous suspension is applied at the above disclosed coating weights and then dried in the conventional manner. A suitable liquid suspension of the top tri-phosphor blend can thereafter be deposited on the dried base phosphor layer again in said conventional manner. For example, 1,000 grams of a typical cool white tri-phosphor blend is suspended with 1,500 milliliters of 0.5 weight percent nitrocellulose binder in butyl acetate solvent to form a suitable top layer liquid coating composition. After drying said top layer, the dual phosphor coated lamps are thereafter lehred at approximately 600° C. for approximately 0.5 minutes in air.

As specific embodiments further describing the presently improved lower cost dual phosphor coated fluorescent lamps of the present invention, a number of fluorescent lamps having the known 40T12 construction at a nominal 40 watt rating were built and tested for comparison with conventional lamps of the same size but coated with only a single layer of cool white calcium halophosphate phosphor having a 0.19 molar manganese content along with a 0.06 molar antimony content. The lumen values achieved with such dual phosphor layer lamps are reported in Table I below.

TABLE I

| Example | Total Phosphor Coating (Mg/Cm$^2$) | Top Phosphor Coating (Mg/Cm$^2$) | Lumens 100 (Hrs) |
|---|---|---|---|
| 1. | 3.39 | .59 | 3398 |
| 2. | 2.69 | .59 | 3350 |
| 3. | 2.76 | .66 | 3373 |
| 4. | 2.31 | .60 | 3243 |
| 5. | 2.0 | .60 | 3236 |

From the above lamp tests it can first be noted that all reduced coating weights according to the present invention still achieved much higher lumen levels as compared to the lumen output achieved with a coating weights of 3.5 milligrams per square centimeter or greater for the conventional calcium halophosphate phosphor (see FIG. 2). Additionally, said lower total weight dual phosphor coatings provide a still higher lumen output than the lumen levels achieved by simply modifying said calcium halophosphate phosphor as taught in the above referenced copending patent application and also do so with a higher CRI value of 70.

In FIG. 2, a graph is depicted which further compares the 100 hour lumen performance in the above described type lamp construction between the lower total weight dual phosphor coatings of the present invention and comparable coating weights of a conventional calcium halophosphate phosphor. As can be noted from curve 12 on said graph, the conventional phosphor coatings having an antimony content of 0.06 mole per mole of phosphor and 10–12 microns diameter particle size exhibit a sharp lumen drop at coating weights of less than about 3.5 milligrams per square centimeter. The lumen performance achieved with the coating weights of phosphor disclosed in examples of 1–5 above which also appear on said graph as curve 11 remain substantially higher for the same total phosphor coating weights.

It will be apparent from the foregoing description that while specific examples have been provided on the presently modified phosphors coatings, lamps and methods used in the preparation of said modified dual phosphor layer coatings, that various further modifications thereof can be made within the spirit and scope of the present invention. For example, it is contemplated as above indicated to employ conventional tri-phosphor blends for the top phosphor layer in the present coatings. Additionally, it is further contemplated to make minor divalent metal ion substitutions in the composition of the modified calcium halophosphate phosphor as taught in the above referenced copending patent application. It is intended to limit the present invention, therefore, only by the scope of the following claims:

What we claim is new and desire to secure by Letters Patent of the United States is:

1. In a fluorescent lamp comprising a glass envelope having electrodes at its ends, a mercury and inert gas filling within said glass envelope which produces ultraviolet radiation, and a phosphor coating which converts a substantial portion of said ultraviolet radiation to visible illumination having a white color, the improvement wherein said coating comprises a dual layer of a first phosphor layer deposited on the inner glass surface and a second phosphor layer deposited on the first phosphor layer, said second phosphor layer comprising a blend of narrow bandwith emitting phosphors, said first phosphor layer comprising phosphor particles having a particle size range extending from about 4 microns average diameter up to about 8 microns average diameter having been deposited at a dry coating weight in the range of from about 1.3 milligrams per square centimeter up to about 3.5 milligrams per square centimeter at said particle size range and said phosphor being essentially a single phase material substantially devoid of secondary diluting or deleterious phases wherein the individual phosphor particles are predominantly single crystals substantially devoid of agglomerated smaller size crystals and have the general formula:

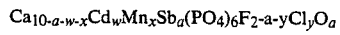

$$Ca_{10-a-w-x}Cd_wMn_xSb_a(PO_4)_6F_{2-a-y}Cl_yO_a$$

wherein
a is in the approximate range of 0.1–0.2
w is in the approximate range of 0–0.2
x is in the approximate range of 0.15–0.5, and
y is in the approximate range of 0.03–0.3
wherein the total metal ion content in the phosphor is maintained equal to at least 9.97, whereby said lamp provides efficient lumen output at a substantially reduced total phosphor coating weight.

2. A lamp as in claim 1 wherein said second phosphor layer is deposited at a dry coating weight in the range from about 0.45 milligrams per square centimeter up to about 1.8 milligrams per square centimeter.

3. A lamp as in claim 2 wherein said second phosphor layer is deposited at a dry coating weight in the range from about 0.45 milligrams per square centimeter up to about 0.78 milligrams per square centimeter and the lamp exhibits a CRI value of at least 68.

4. A lamp as in claim 2 wherein said second phosphor layer is deposited at a dry coating weight in the range from about 1.13 milligrams per square centimeter up to about 1.78 milligrams per square centimeter and the lamp exhibits a CRI value of at least 78.

5. A lamp as in claim 1 exhibiting a cool white color point having trichromatic coordinates of approximately X =0.376 and Y =0.387 wherein x is in the approximate range 0.15–0.20 and a is in the approximate range 0.1–0.2.

6. A lamp as in claim 1 exhibiting a white color point having trichromatic coordinates of approximately X =0.413 and Y =0.393 wherein x is in the approximate range 0.23-0.28 and a is in the approximate range 0.1-0.2.

7. A lamp as in claim 1 exhibiting a warm white color point having trichromatic coordinates of approximately X =0.440 and Y =0.403 wherein x is in the approximate range 0.35-0.40 and a is in the approximate range 0.1-0.2.

8. In a fluorescent lamp comprising a tubular shaped glass envelope having electrodes at its ends, a mercury and inert gas filling which produces a low pressure discharge of ultraviolet radiation, and a phosphor coating deposited on the interior surface of said glass envelope which converts substantially all of the incident ultraviolet radiation to visible illumination having a white color, the improvement wherein said coating comprises a dual layer of a first phosphor layer deposited on the inner glass surface and a second phosphor layer deposited on the first phosphor layer, said second phosphor layer comprising a blend of narrow bandwith emitting phosphors blended in proportions to achieve approximately the same white color paint as exhibited by the first phosphor layer, said first phosphor layer comprising phosphor particles having a particle size range extending from about 4 microns average diameter up to about 8 microns average diameter having been deposited at a dry coating weight in the range of from about 1.3 milligrams per square centimeter up to about 3.5 milligrams per square centimeter at said particle size range and said phosphor being essentially a single phase material substantially devoid of secondary diluting or deleterious phases wherein the individual phosphor particles are predominantly single crystals substantially devoid of agglomerated smaller size crystals and have the general formula:

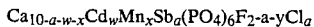

$Ca_{10-a-w-x}Cd_wMn_xSb_a(PO_4)_6F_{2-a-y}Cl_a$ wherein
 a is in the approximate range of 0.1-0.2
 w is in the approximate range of 0-0.2
 x is in the approximate range of 0.15-0.5, and
 y is in the approximate range of 0.03-0.3
wherein the total metal ion content in the phosphor is maintained equal to at least 9.97, whereby said lamp provides efficient lumen output at a substantially reduced total phosphor coating weight and exhibits a CRI value of at least 68.

9. A lamp as in claim 8 wherein said second phosphor layer is deposited at a dry coating weight in the range from about 0.45 milligrams per square centimeter up to about 1.8 milligrams per square centimeter.

10. A lamp as in claim 9 wherein said second phosphor layer is deposited at a dry coating weight in the range from about 0.45 milligrams per square centimeter up to about 0.78 milligrams per square centimeter.

11. A lamp as in claim 9 wherein said second phosphor layer is deposited at a dry coating weight in the range from about 1.13 milligrams per square centimeter up to about 1.78 milligrams per square centimeter and the lamp exhibits a CRI value of at least 78.

12. A lamp as in claim 8 exhibiting a cool white color point having trichromatic coordinates of approximately X =0.376 and Y =0.387 wherein x is in the approximate range 0.15-0.20 and a is in the approximate range 0.1-0.2.

13. A lamp as in claim 8 exhibiting a white color point having trichromatic coordinates of approximately X =0.413 and Y =0.393 wherein x is in the approximate range 0.23-0.28 and a is in the approximate range 0.1-0.2.

14. A lamp as in claim 8 exhibiting a warm white color point having trichromatic coordinates of approximately X =0.440 and Y =0.403 wherein x is in the approximate range 0.35-0.40 and a is in the approximate range 0.1-0.2.

* * * * *